United States Patent
Kim et al.

(10) Patent No.: US 8,369,619 B2
(45) Date of Patent: Feb. 5, 2013

(54) METHOD AND APPARATUS FOR SKIN COLOR CORRECTION AND DIGITAL PHOTOGRAPHING APPARATUS USING BOTH

(75) Inventors: Jong-sun Kim, Suwon-si (KR); Seung-hun Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 608 days.

(21) Appl. No.: 12/616,880

(22) Filed: Nov. 12, 2009

(65) Prior Publication Data

US 2010/0150442 A1 Jun. 17, 2010

(30) Foreign Application Priority Data

Dec. 11, 2008 (KR) .................. 10-2008-0125965

(51) Int. Cl.
*G06K 9/00* (2006.01)
(52) U.S. Cl. ...................................... 382/167
(58) Field of Classification Search .......... 382/100, 382/103, 115, 118, 162, 164–165, 170, 171, 382/173, 181, 224, 228, 276
See application file for complete search history.

(56) References Cited

U.S. PATENT DOCUMENTS

| | | | | |
|---|---|---|---|---|
| 6,690,822 B1* | 2/2004 | Chen et al. | .................. | 382/162 |
| 7,590,266 B2* | 9/2009 | Kato et al. | .................. | 382/118 |
| 7,602,943 B2* | 10/2009 | Fukui et al. | .................. | 382/103 |
| 7,869,631 B2* | 1/2011 | Xu et al. | .................. | 382/118 |
| 8,019,170 B2* | 9/2011 | Wang et al. | .................. | 382/239 |
| 8,154,612 B2* | 4/2012 | Quan et al. | .................. | 348/222.1 |

FOREIGN PATENT DOCUMENTS

| | | |
|---|---|---|
| JP | 2002-044469 A | 2/2002 |
| JP | 2006-343989 A | 12/2006 |

* cited by examiner

*Primary Examiner* — Jose Couso
(74) *Attorney, Agent, or Firm* — Drinker Biddle & Reath LLP

(57) ABSTRACT

An apparatus and method of correcting skin color in an image is disclosed. The method may include extracting skin colors; analyzing the extracted skin colors to calculate axes of a different vector space; transforming the extracted skin colors to the different vector space; using the result of the transformed skin colors to identify a color from an input image as a skin color; and correcting the color identified as a skin color. The different vector space may be a principal components analysis (PCA) vector space. Extracting skin colors may include detecting a face region as a skin region in an input image and extracting skin colors from the face region. A lookup table be generated according to the result of projecting the skin colors to fewer dimensions of the different vector space. Extracting skin colors may include extracting colors from a training image of skin colors.

19 Claims, 10 Drawing Sheets

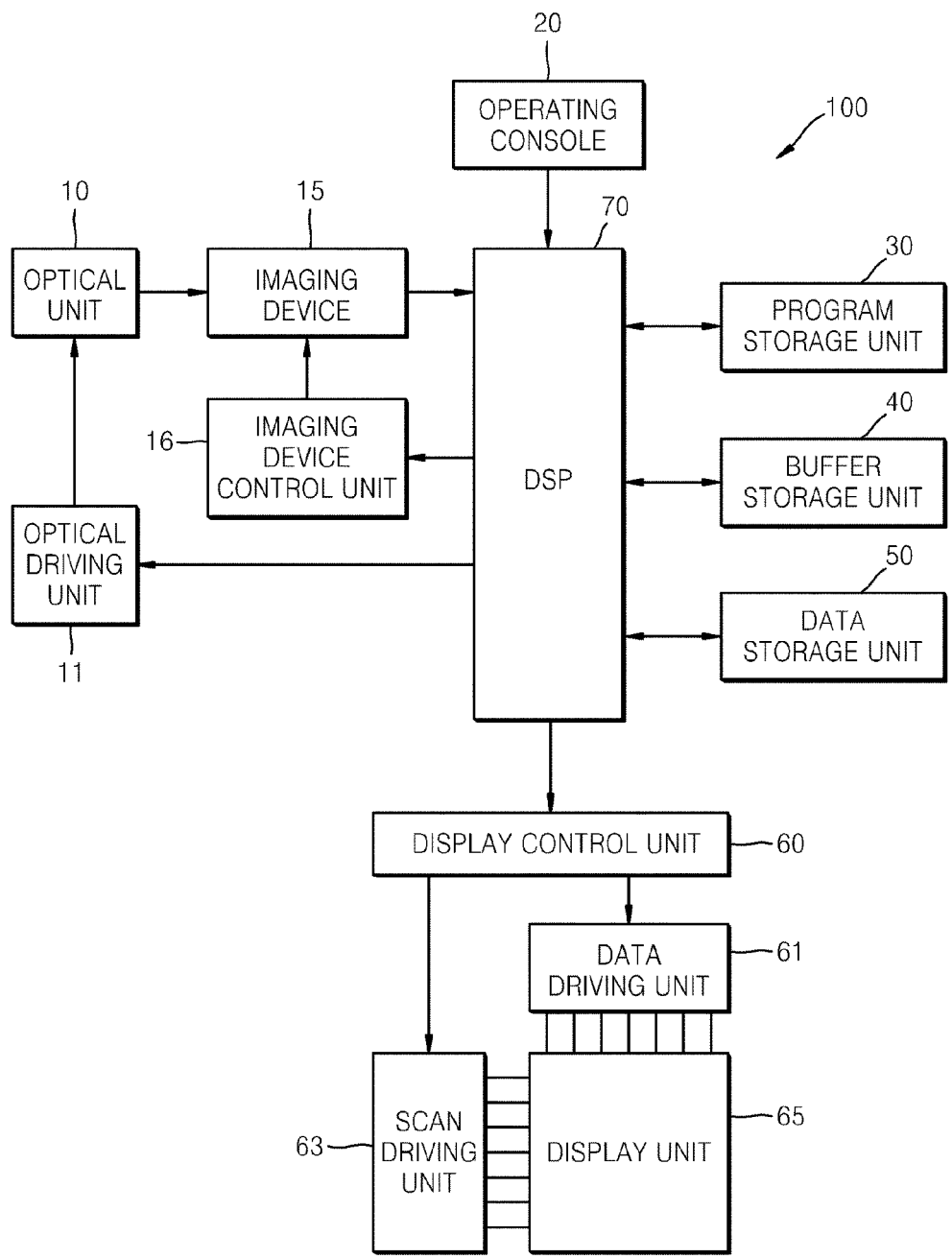

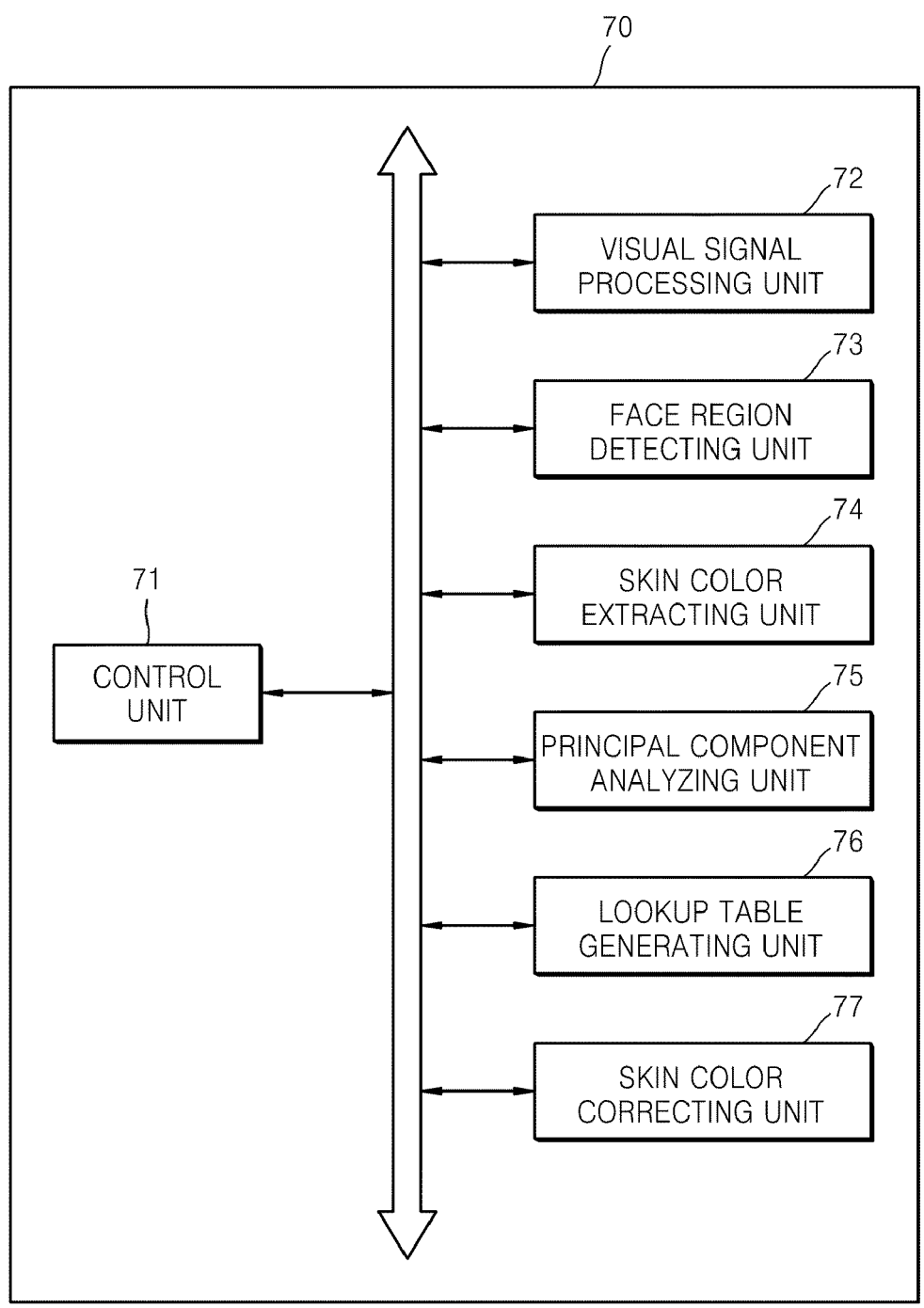

METHOD AND APPARATUS FOR SKIN COLOR CORRECTION AND DIGITAL PHOTOGRAPHING APPARATUS USING BOTH

CROSS-REFERENCE TO RELATED PATENT APPLICATION

This application claims the benefit of Korean Patent Application No. 10-2008-0125965, filed on Dec. 11, 2008 in the Korean Intellectual Property Office, the entire contents of which is incorporated herein by reference.

BACKGROUND OF THE INVENTION

1. Field of the Invention

The present invention relates to image processing, and more particularly, to a method and an apparatus for effectively correcting skin color on an obtained face image, and to a digital photographing apparatus using both.

2. Description of the Related Art

With the developments of digital photographing apparatuses, image processing is rapidly shifting from analog to digital. Viewers of images captured by digital photographing apparatuses such as digital cameras and digital camcorders are particularly interested in the quality of the colors of the face or the skin of a person captured in the images. Therefore, skin color correction is important for improving the performance of the digital photographing apparatuses.

However, to correct skin colors in a captured image to more natural colors, it is first necessary to identify the skin in the captured image from similar colors of non-skin such as background colors and non-human subject colors.

SUMMARY OF THE INVENTION

The present invention provides a method, apparatus, and computer readable medium for correcting skin color in an image. The method includes: extracting skin colors; analyzing the extracted skin colors to calculate axes of a different vector space; transforming the extracted skin colors to the different vector space; using the result of the transformed skin colors to identify a color from an input image as a skin color; and correcting the color identified as a skin color.

The method may further include detecting a skin region in the input image. Extracting may include extracting skin colors from the detected skin region.

Extracting may further include extracting skin colors from a skin training image.

Detecting a skin region may further include detecting a face region as a skin region in an input image.

Analyzing may further include analyzing the extracted skin colors to calculate axes of a different vector space, the axes being calculated using principal components analysis (PCA).

Projecting may include projecting the transformed colors to fewer dimensions of the different vector space.

Only skin color regions may be extracted from the face region.

The method may further include: generating a lookup table according to the result of projecting the skin colors to fewer dimensions of the different vector space; wherein using the result further comprises: using the lookup table to identify a color from the input image as a skin color.

Projecting may further include projecting the extracted skin colors to fewer dimensions of the different vector space, the fewer dimensions excluding a principal axis, wherein the principal axis is the axis having the largest eigenvalue of the axes of the different space.

Extracting may include extracting 3-dimensional skin colors; wherein analyzing further comprises: analyzing the extracted skin colors to calculate axes of a 3-dimensional PCA vector space; and projecting the extracted skin colors to 2-dimensions of the 3-dimensional PCA vector space.

The lookup table may comprise skin colors projected to 2-dimensions of the different vector space.

Correcting the color identified as a skin color may include extracting the color from the input image; transforming the color to the new vector space; and identifying the color as a skin color based on a closeness of the transformed color to the transformed skin colors in the new vector space.

Identifying the color as a skin color may include identifying the color as a skin color further based on identifying skin regions in the input image and identifying the color as a skin color based on the geographic closeness of the color to an identified skin region in the input image.

The colors may be represented using one of the following color models: red, green, and blue (RGB); hue-intensity-saturation (HIS); luminance and hue (YIQ); and, luminance and chrominance (YCC).

An apparatus for skin color correction is disclosed. The apparatus may include a face region detecting unit configured to detect a face region in an input image; a skin color extracting unit configured to extract skin colors from the detected face region; a principal component analyzing unit configured to perform a principal components analysis using skin colors to calculate axes for a principal component analysis (PCA) vector space and transform the extracted skin colors to the PCA space; and a skin color correcting unit configured to identify a color of the input image as a skin color using the result of the transformed skin colors to the PCA space and configured to correct a color identified as a skin color.

The principal component analyzing unit may include configured to project the transformed extracted skin colors to 2-dimensions of the PCA space.

The principal component analyzing unit may be configured to project the transformed extracted skin colors to 2-dimensions of the PCA space, where the 2-dimensions not including a principal axis, and wherein the principal axis is an axis having the largest eigenvalue from among the axes of the PCA space.

The principal component analyzing unit may be configured to perform a principal components analysis using skin colors extracted by the skin color extracting unit.

The principal component analyzing unit may extract selective colors from the face region as skin colors.

The apparatus may include a lookup table generating unit for generating a lookup table according to the result of the transformed skin colors to the PCA space, wherein the skin color correcting unit identifies a color as a skin color using the lookup table.

The lookup table may include the 2-dimensional skin color data.

The principal component analyzing unit is configured to perform a principal components analysis using skin colors from a skin color training image.

The skin color correcting unit may include a skin region separating unit for separating skin regions from the input image according to skin color; a skin correction region designating unit for designating regions to perform skin color correction from among the separated skin regions; and a skin color correction processing unit for performing a skin color correction on the designated regions.

The colors may be represented using one of the following color models: red, green, and blue (RGB); hue-intensity-saturation (HIS); luminance and hue (YIQ); and, luminance and chrominance (YCC).

A computer readable recording medium encoded with a computer executable program to perform a method is disclosed. The method includes: extracting skin colors; analyzing the extracted skin colors to calculate axes of a different vector space; transforming the extracted skin colors to the different vector space; using the result of the transformed skin colors to identify a color from an input image as a skin color; and correcting the color identified as a skin color.

BRIEF DESCRIPTION OF THE DRAWINGS

The above and other features and advantages of the present invention will become more apparent by describing in detail exemplary embodiments thereof with reference to the attached drawings in which:

FIG. 1 is a block diagram of an example of a digital photographing apparatus according to an embodiment of the present invention;

FIG. 2 is a block diagram of an example of a digital signal processing unit of the digital photographing apparatus shown in FIG. 1;

DETAILED DESCRIPTION OF THE INVENTION

Figure 3A:
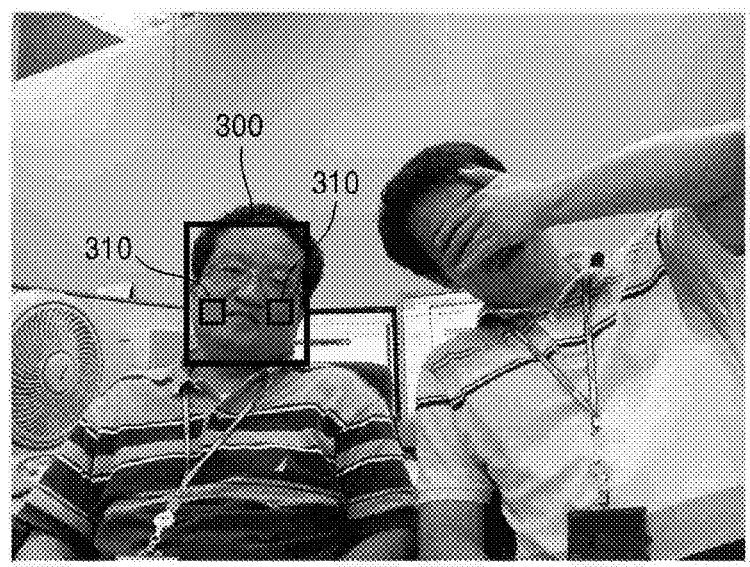
FIGS. 3A through 3C are photographic images and a diagram for describing skin region extraction using a RGB color distribution in the prior art.

Hereinafter, the present invention will be described in detail by explaining exemplary embodiments of the invention with reference to the attached drawings.

FIG. 1 is a block diagram of an example of a digital photographing apparatus 100 according to an embodiment of the present invention, and FIG. 2 is a block diagram of an example of a digital signal processing unit 70 of the digital photographing apparatus 100.

Referring to FIG. 1, the digital photographing apparatus 100 includes an optics unit 10, an optics driving unit 11, an imaging device 15, an imaging device control unit 16, an operating console 20, a program storage unit 30, a buffer storage unit 40, a data storage unit 50, a display control unit 60, a data driving unit 61, a scan driving unit 63, a display unit 65, and a digital signal processing unit (DSP) 70.

An optical signal from a subject is input to the optics unit 10 and is provided to the imaging device 13. The optics unit 10 may include at least one lens such as a zoom lens for either narrowing or widening the angle of view, a focus lens for focusing on a subject, etc. Furthermore, the optics unit 10 may further include an iris for controlling the intensity of incident light.

The optics driving unit 11 controls positions of the lenses, opening of the iris, etc. The lenses may be repositioned to adjust the focus. Furthermore, the opening of the iris may be adjusted to control the intensity of incident light. The optics driving unit 11 may control the optics unit 10 according to a control signal either automatically generated from visual signals input in real-time or manually input by a user.

An optical signal that passed through the optics unit 10 reaches a light receiving surface of the imaging device 15 that forms an image of a subject. The imaging device 15 may be a charge coupled device (CCD) or a complementary metal oxide semiconductor image sensor (CIS) that converts optical signals to electric signals. The imaging device control unit 16 may control the sensitivity of the imaging device 15, for example. The imaging device control unit 16 may also control the imaging device 15 according to a control signal either automatically generated from visual signals input in real-time or manually input by a user.

The operating console 20 is a unit via which an external control signal from a user can be input. The operating console 20 includes various function buttons such as a shutter-release button for inputting a shutter-release signal to capture an image by exposing the imaging device 15 for a predetermined time, a power button to supply power to the digital photographing apparatus 100, zoom buttons for widening and narrowing the angle of view, mode selecting buttons for selecting various modes such as a text input mode, an image capturing mode, a playback mode, etc., a white balance button, an exposure button, etc.

According to another embodiment of the present invention, a user can select a skin color correction mode for correcting the skin color in a captured image via the operating console 20.

While the operating console 20 may be embodied as various buttons as described above, the present invention is not limited thereto, and the operating console 20 may also be embodied as any form including a keyboard, a touch pad, a touch screen, a remote controller, etc., as long as a user can input signals thereby.

Furthermore, the digital photographing apparatus 100 includes the program storage unit 30 for storing programs such as an operating system and applications for driving the digital photographing apparatus 100, the buffer storage unit 40 for temporarily storing data necessary for process and/or result data, and the data storage unit 50 for storing various data required by the programs, data such as image files containing visual signals.

According to another embodiment of the present invention, the buffer storage unit 40 stores a RGB lookup table containing sample skin color data of a captured image and a lookup table composed by converting the sample skin color data of the captured image into a principal component analysis (PCA) space using principal component analysis.

Furthermore, the digital photographing device 100 includes the display control unit 60 which controls the digital photographing device 100 to display its operating status and/or data regarding an image captured by the digital photographing device 100, the data driving unit 61 and the scan driving unit 63 which transmit data input by the display control unit 60, and the display unit 65 which displays a predetermined image according to signals input by the data driving unit 61 and the scan driving unit 63. The display unit 65 may be formed as a liquid crystal display (LCD), an organic light emitting diode (OLED), electro deposition display (EDD), etc.

Furthermore, the digital photographing device 100 may include the digital signal processing unit 70 which processes input visual signals and controls each of the components of the digital photographing device 100 according to either the processed visual signals or externally input signals.

The digital signal processing unit 70 will be described below with reference to FIG. 2.

Referring to FIG. 2, an embodiment of the digital signal processing unit 70 includes a control unit 71, a visual signal processing unit 72, a face region detecting unit 73, a skin color extracting unit 74, a principal component analyzing unit 75, a lookup table generating unit 76, and a skin color correcting unit 77.

The control unit 71 controls overall operations of the digital signal processing unit 70.

The visual signal processing unit 72 converts visual signals input by the imaging device 15 into digital signals, and performs visual signal processes such as gamma correction, color filter array interpolation, color matrix, color correction, color enhancement, etc., to convert a digital signal into an image recognizable by a user.

Furthermore, the visual signal processing unit 72 may perform algorithms such as auto white balance and auto exposure, if the visual signal processing unit 72 is set up to use the algorithms. Furthermore, the visual signal processing unit 72 resizes visual data by using a scalar, compresses the visual data, and forms an image file in a predetermined format. Furthermore, the visual signal processing unit 72 may decompress an image file. The visual signal processing unit 72 may perform visual signal processes as stated above to visual signals input in real-time in a live-view mode before an image is captured and visual signals input in response to a shutter-release signal. Different visual signal processes may be performed to each of the visual signals.

The face region detecting unit 73 detects a face region in an image processed by the visual signal processing unit 72, where the face region detection involves detecting the location of a face in an input image. The face region detecting unit 73 compares data regarding face characteristics stored in advance and input image data and determines whether the input image data contains the data regarding face characteristics or not, and, if it is determined that the input image data contains the data regarding face characteristics, detects the location of the determined data within the input image. Various techniques for face region detection already exist, and for example, a face region may also be detected by using Ada-boosting algorithm and skin color data. In an embodiment, the face region detecting unit 73 detects a different part of a human with skin other than a face. For example, the face region detecting unit 73 may detect a hand region or shoulder region to use for examples of skin colors.

The skin color extracting unit 74 extracts skin colors from a detected face region or other detected skin region. The colors may be represented using color models including, but not limited by, RGB, HIS, YIQ, and YCC. The skin colors may be represented using RGB input via the imaging device 15 or skin colors may be converted into HIS, YIQ, and YCC by the visual signal processing unit 72. For example, the skin color extracting unit 74 may extract skin colors, which are similar to a skin color learned in advance. The skin color extracted by the skin color extracting unit 74, as described above, is widely distributed throughout an RGB color space.

The skin color extracting unit 74 may build a region of skin colors add to the region of skin colors based on known skin colors and how geographically close a color is to the region of skin colors.

The principal component analyzing unit 75 analyzes principal components of skin colors extracted by the skin color extracting unit 74 and transforms the principal components into a different vector space. For example, a PCA space. Here, a general method of analyzing principal components of skin colors involves processing colors by transforming the colors to a different vector space. For example, a PCA space. The method may include reducing the dimension of the data to a lower dimension, e.g., dimension K, while maintaining the original color as much as possible with respect to colors containing multi-dimensional, e.g., N-dimensional color vectors.

The principal component analyzing unit 75, may calculate a different vector space. For example, the principal component unit 75 may calculate the axes of a PCA vector space. The axes may be calculated by finding a principal axis that minimizes the square of the distance of each color in the RGB space to that axis. This can then be used as a principal axis for the PCA vector space. The other two axes of the PCA vector space may be orthogonal to the PCA vector space.

For example, colors represented in RGB may have three values, the red component, the green component, and the blue component, and may be transformed to a 3-dimensional PCA space and then projected onto 2-dimensions of the 3-dimensional PCA space. The projection may be on the two axes of the PCA space that are not the principal axis. By calculating a different vector space using colors that are presumed to skin colors, and then transforming the skin colors to the new vector space, and then projecting the skin colors to 2-dimensions of the new vector, a distribution cluster of the skin colors can be formed that can be used to identify colors in the larger image as either being skin or non-skin colors.

Thus, skin regions can be extracted to perform correction on without including non-skin regions.

Descriptions thereof in closer detail will be given below with reference to FIGS. 3 through 5.

Figure 3B:
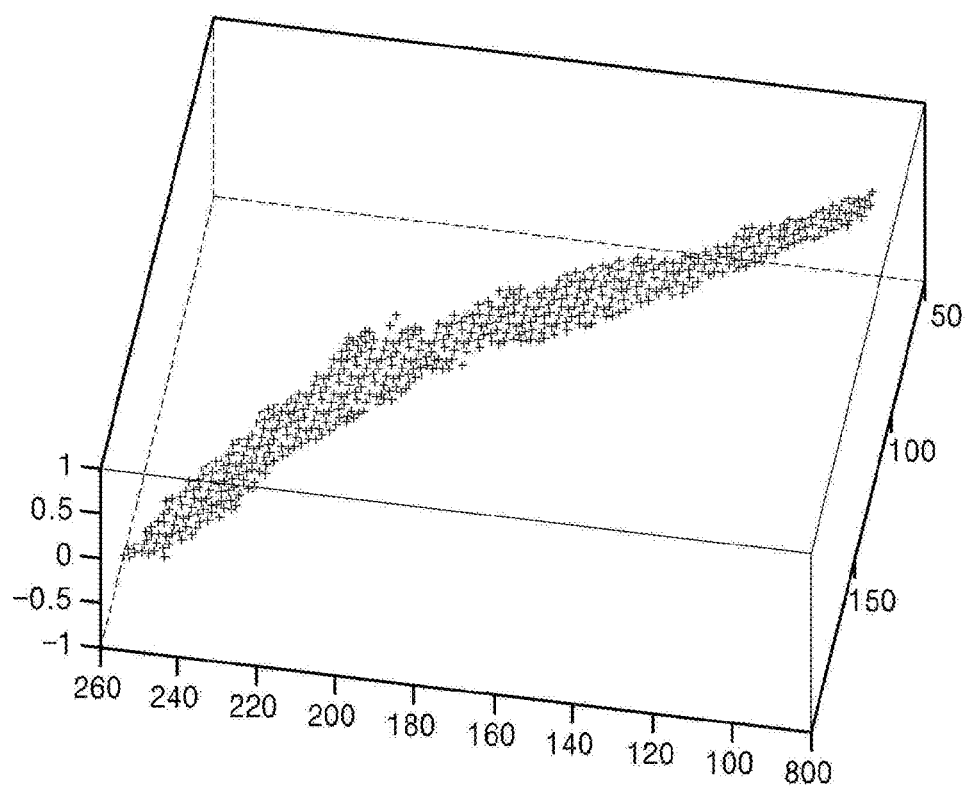
Figure 3C:

FIGS. 3A through 3C are photographic images and an example of a diagram for describing skin region extraction using a RGB color distribution.

Referring to FIGS. 3A through 3C, FIG. 3A shows an input image of which the skin color is to be corrected. In the input image, a face region 300 is detected, and skin color data 310 is extracted. When the skin color data 310 is expressed in a RGB color space, a color distribution as shown in FIG. 3B can be obtained, which represent the red, green, and blue components of the color. Due to differences in illumination of the skin of the subject, skin colors are widely distributed throughout the RGB color vector space. Because the skin colors are widely distributed throughout the RGB color vector space, it is difficult to distinguish between skin and non-skin colors. Illustrated in FIG. 3C is the result of classifying the image according to skin color or non-skin colors using the RGB color space. Many non-skin colors are classified as skin colors 310. For example, part of the shirt 320 is classified as a skin color 310. Thus, skin color correction may be performed on both skin colors and non-skin colors 320, which may degrade the non-skin colors 320, and reduce the quality of the image.

Figure 4A:
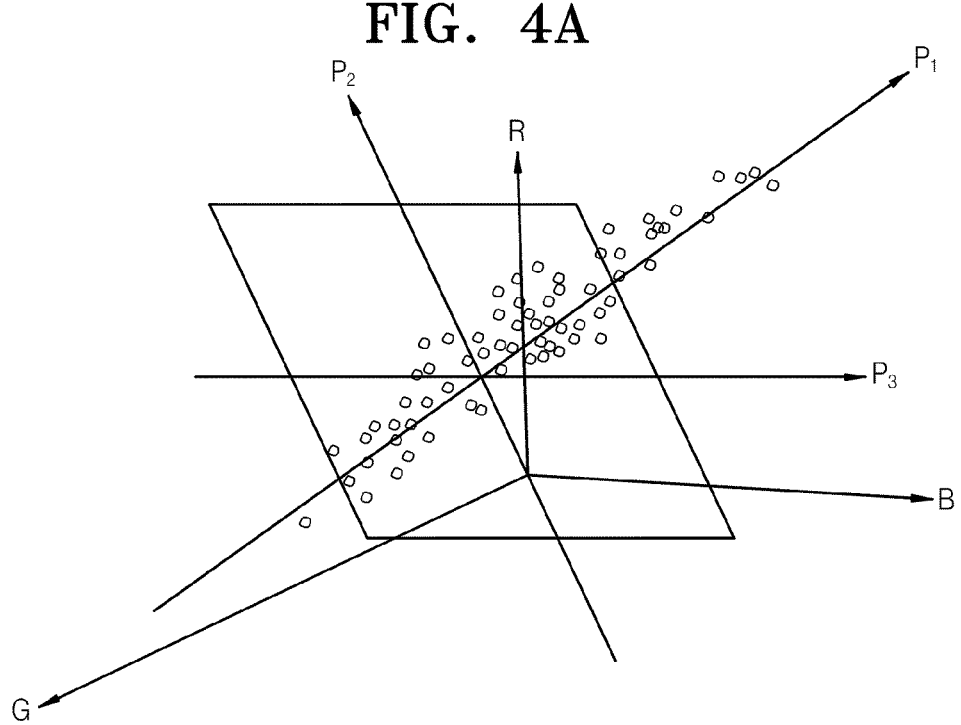
FIGS. 4A through 4C are diagrams for describing a method of analyzing principal components according to another embodiment of the present invention.
Figure 4B:
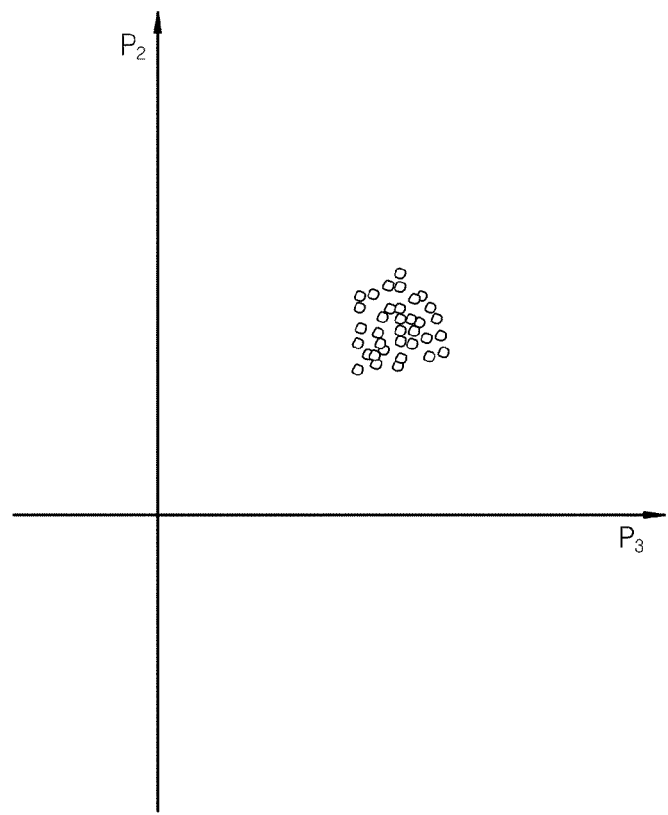

As shown in FIG. 4A, the principal component analyzing unit 75 may compute a different vector space to transform the skin color distribution of the image on. In an embodiment, the component analyzing unit 75 may compute a PCA space to transform the skin color distribution from a RGB vector space to a PCA vector space. In an embodiment, the principal axis may be computed by finding a axis that minimizes the square of the distance of each point to that axis. Many variations to finding a principal axis are possible. The RGB colors are transformed to the PCA vector space and the projected to 2-dimensions of the PCA vector space. A denser skin color distribution may then be obtained as shown in by FIG. 4B. Here, the principal component analyzing unit 75 projects the skin color distribution in a RGB 3 dimensional color space along two orthogonal axis $P_2$ and $P_3$ other than the principal axis $P_1$ of a PCA space to obtain the skin color distribution as shown in FIG. 4B. The skin color distribution of FIG. 4B may then be used to more accurately distinguish between skin colors and non-skin colors. Calculations may be used that both transform and project the RGB colors to the 2-dimensional PCA space.

Transforming and projecting the RGB color from a vector space for RGB color to a PCA vector space can be calculated according to Mathematical Expression 1 below.

$$X_{PCA} = W_{pca}^T * X = \begin{pmatrix} P_2 \\ P_3 \end{pmatrix} * X_{RGB} \quad \text{[Mathematical Expression 1]}$$

Here, $X_{RGB}$ indicates colors in an RGB space, whereas $X_{PCA}$ indicates colors in a PCA space. $W_{PCA}^T$ indicates a matrix which converts colors represented in RGB space into colors represented in PCA space. The PCA axes are $P_1$, $P_2$, and $P_3$ which may be orthogonal to one another.

According to another embodiment of the present invention, the PCA axes can be obtained in prior training with respect to a skin color distribution. The PCA axes may be predetermined and shipped with the device or downloaded to the device. The axes of the PCA vector space can be calculated according to Mathematical Expression 2 below.

$$C \cdot P = \lambda \cdot P \quad \text{[Mathematical Expression 2]}$$

Here, C indicates a covariance matrix with respect to RGB values of a skin color training image, and $P = \{P_1, P_2, P_3\}$ and $\lambda$ indicate the eigenvector and the eigenvalue, respectively. P are assorted in descending order of eigenvalues. In other words, P1 is the axis having the largest eigenvalue, and thus P1 is the principal axis. According to another embodiment of the present invention, the PCA axes are obtained by calculating eigenvalues and eigenvectors. However, the present invention is not limited thereto, and principal components of skin color data can be obtained according to a singular value decomposition (SVD) method.

Figure 4C:
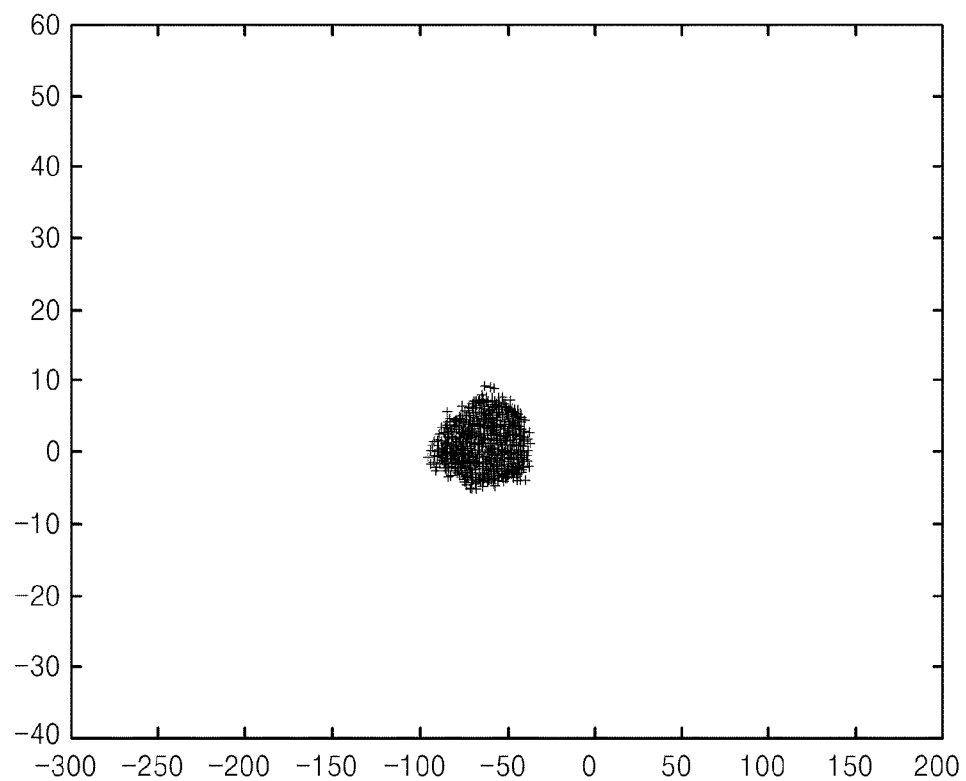

The principal component analyzing unit 75 may compute the axes P of a PCA space and transform and project the skin color distribution from an RGB space into the PCA space. The analyzing unit may project the color distribution along the two PCA axes $P_2$ and $P_3$, where $P_1$ is the principal axis. FIG. 4A illustrates the principal axis of the PCA vector space in the RBG vector space. The principal axis is selected to less the distribution from the principal axis. The result of transforming and projecting skin color distribution from an RGB space onto two axes of a PCA space is illustrated in FIG. 4B. As a result, the dense color distribution as shown in FIG. 4C can be obtained. The dense color distribution makes it easier to distinguish between skin color and non-skin color in images.

Figure 5:
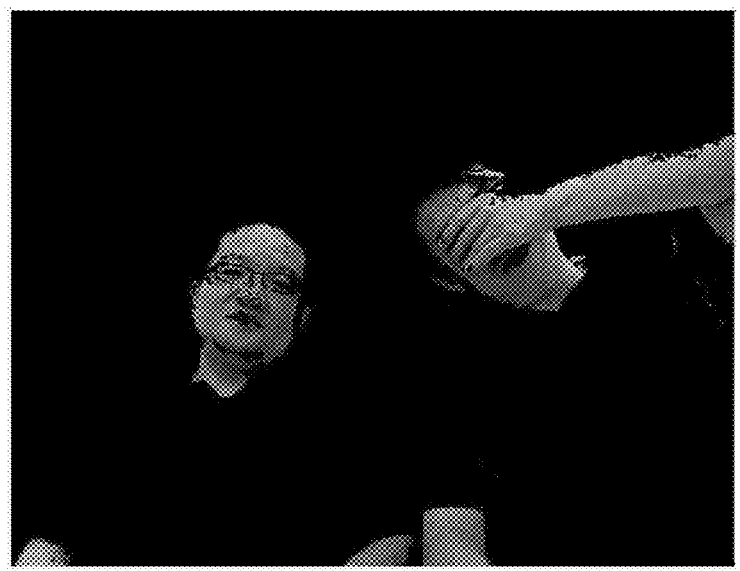
FIG. 5 is a photographic image for describing extraction of a skin color region using a method of analyzing principal components according to another embodiment of the present invention.

FIG. 5 is a photographic image showing the colors that were identified as skin colors from an input image by first calculating a PCA space from skin colors extracted from the face 310 of FIG. 3A, and then projecting the colors from the image into the PCA space and distinguishing between skin and non-skin colors based on how close the color was to the cluster of FIG. 4C. Comparing FIGS. 3 and 5, it is clear that skin colors are detected in an entire image. For example, region 320 was identified as skin color in FIG. 3, but not in FIG. 5. When projected skin color data has a wider distribution in the RGA 3-dimensional vector space more colors are identified as skin colors compared with computing the PCA vector space and transforming and projecting the RGB colors onto a 2-dimensional PCA vector space.

Further, computing the different vector space, the PCA vector space as described above, for a particular image may have the advantage of that the skin colors may be better distinguished compared with generate skin color training images.

The lookup table generating unit 76 generates a lookup table to enable quickly distinguishing between skin and non-skin colors. The lookup table may contain numbers according to a result of projecting the RGB color distribution onto a 2-dimensional PCA vector space (illustrated in FIG. 4C).

Further, the tighter distribution of the colors as illustrated in FIG. 4C enables the use of the lookup table, which may not be possible with broader distribution of colors.

The skin color correcting unit 77 corrects skin colors in an input image according to skin color data recorded in the lookup table. The configuration of the skin color correcting unit 77 will be described below in closer detail with reference to FIG. 6.

Figure 6:
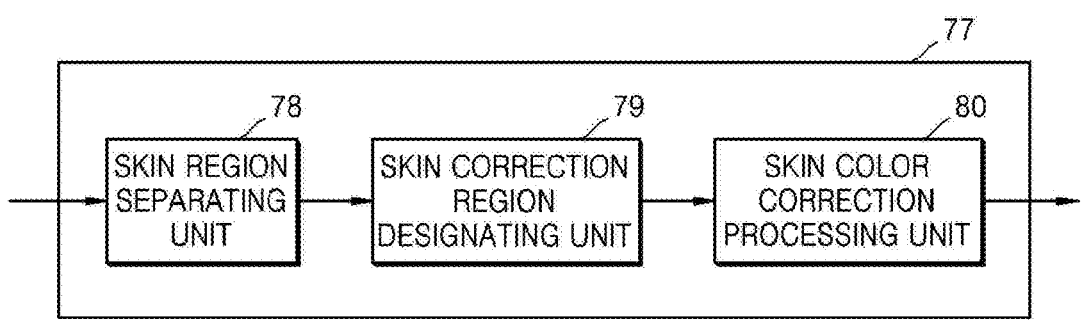
FIG. 6 is a block diagram of a skin color correcting unit shown in FIG. 2.

Referring to FIG. 6, the skin color correcting unit 77 includes a skin region separating unit 78, a skin correction region designating unit 79, and a skin color correction processing unit 80.

The skin region separating unit 78 separates skin regions from an input image according to 2-dimensional skin color data recorded in a lookup table. Here, the 2-dimensional skin color data is data of skin color projected into a PCA space, and thus only regions having skin color data identical or similar to the 2-dimensional skin color data are detected and separated from the input image. The skin region separating unit 78 may determine whether or not a color is skin based on the geographic location of the color in the image in relation to a known skin region. The skin region separating unit 78 may build skin regions by distinguishing between skin and non-skin colors based on the proximity of the color to a known region of skin color. The skin region separating unit 78 may determine whether or not a color is a skin color based on a calculated closeness of the color to presumed skin colors in the different vector space. For example, a Euclidian distance may be calculated between the color from the image and the closest presumed color.

The skin correction region designating unit 79 designates regions to perform skin color correction from among skin regions separated by the skin region separating unit 78. The designation by the skin correction region designating unit 79 can be either selectively made by a user or made according to settings. For example, separated skin regions may be displayed so that a user can select particular regions to perform skin color correction by touching the particular regions.

The skin color correction processing unit 80 performs skin color correction on the designated skin regions. Here, skin color correction can be performed according to various methods in the prior art. For example, corrections such as original skin color correction, contrast correction, preferred skin color correction, etc., can be performed on the designated skin regions. Furthermore, it is clear that the functions of the skin color correction processing unit 80 may be performed by the visual signal processing unit 72.

Figure 7:
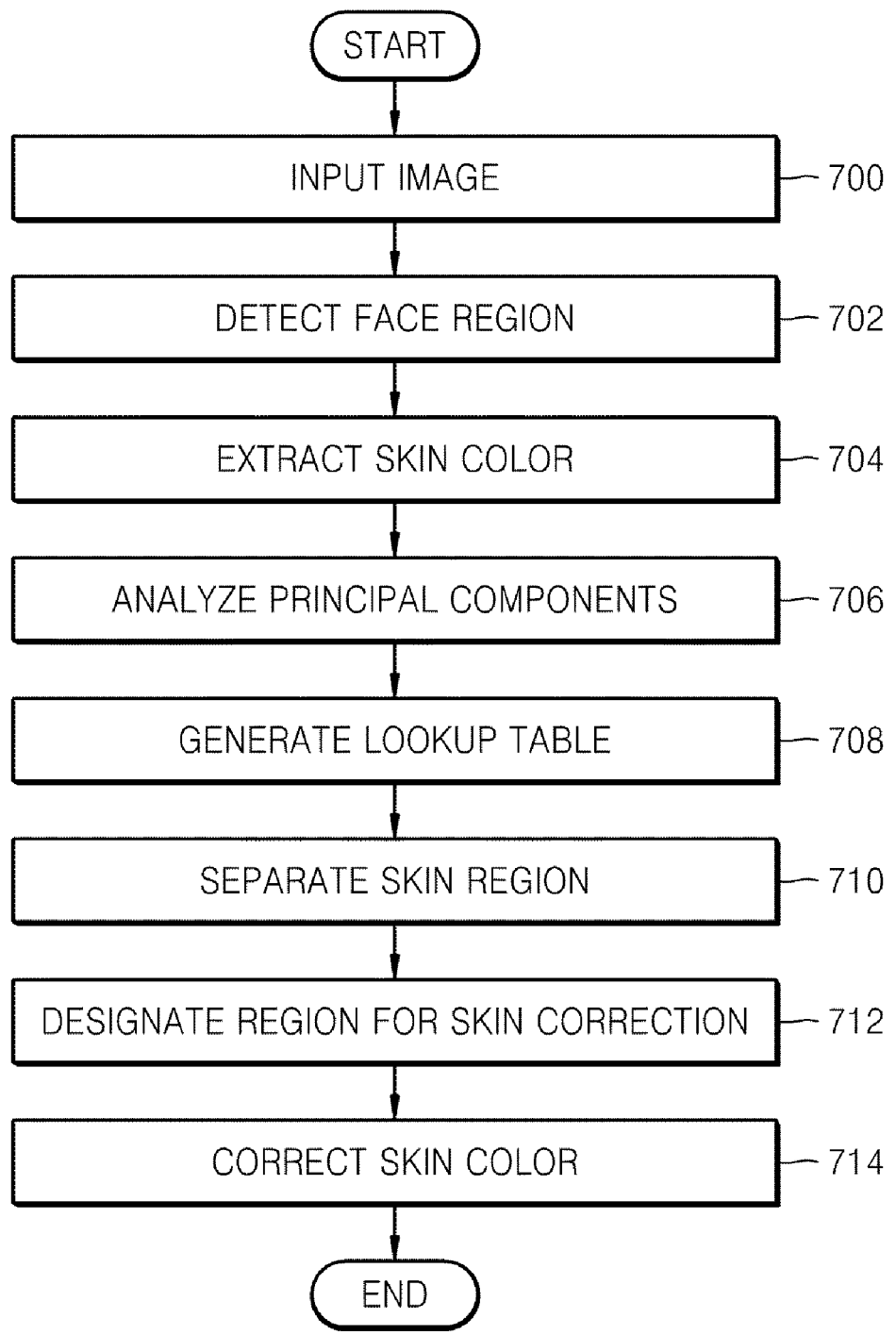
FIG. 7 is a flowchart of an example of a method of skin color correction, according to another embodiment of the present invention.

FIG. 7 is a flowchart of a method of skin color correction, according to an embodiment of the present invention.

Referring to FIG. 7, the method being with operations 700 and 702, a face region or other region presumed to be skin is detected in an input image. The method continues with operation 704, extract skin color, where skin color data is extracted from the face region or other region presumed to be skin.

The method continues with operation 706, the extracted skin color data is transformed to skin color data in a different vector space. For example, a PCA space by transforming and projecting the extracted skin color data into the PCA space using principal component analysis as described above. Here, the PCA axes used for the projection are orthogonal axes, excluding the principal axis, and thus, the dimension of the skin color data is reduced, and a tighter distribution of the skin colors is possible (See FIG. 4C). Using the transformed and projected skin colors permits skin colors to be distinguished from non-skin colors in the image.

The method continues with operation 708, a lookup table is generated by using skin colors in a PCA space. The method continues with operation 710, skin regions are separated from an input image by using skin colors data in the generated lookup table. The method continues with operation 712, regions to perform skin color correction are designated from among the separated skin regions, and appropriate skin color correction is performed on the designated skin regions in operation 714.

FIGS. 8A through 8D are photographic images for describing the results of skin color correction, according to embodiments of the present invention.

Figure 8A:
FIGS. 8A through 8D are photographic images for describing effects of skin color correction, according to another embodiment of the present invention.
Figure 8B:

FIG. 8A shows an input image, and FIG. 8B shows a face region of the input image.

Figure 8C:
Figure 8D:

FIG. 8C shows a result image of skin color correction with respect to the input image of FIG. 8A, and FIG. 8D shows a face region of the image of FIG. 8C.

Comparing FIGS. 8B and 8D, it is apparent that the face region shown in FIG. 8D is cleaner and clearer than that shown in FIG. 8B.

Therefore, the methods and apparatus described above enable some skin colors to be distinguished from non-skin colors in an image so that some skin colors can be corrected without correcting non-skin colors.

The embodiments described above are described with respect to a digital camera as an example of digital photographing apparatuses. However, the present invention is not limited thereto. Thus, it will be understood by those of ordinary skill in the art that the present invention can also be applied to cellular phones with cameras, personal digital assistants (PDAs), and portable multimedia players (PMPs). Furthermore, the present invention can be equally applied to any digital apparatuses capable of image processing.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

The various illustrative logics, logical blocks, units, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of correcting skin color in an image, the method comprising:
    extracting skin colors with a skin color extracting unit;
    analyzing the extracted skin colors to calculate axes of a different vector space,
        wherein the analyzing utilizes:
            a principal component analyzing unit configured to perform a principal components analysis (PCA) using skin colors extracted by the skin color extracting unit to calculate axes for a principal component analysis vector space; and
            a processor of an image processing device;
    transforming the extracted skin colors to the PCA space;
    using the result of the transformed skin colors to identify a color from an input image as a skin color; and
    correcting the color identified as a skin color.

2. The method of claim 1, further comprising:
    detecting a skin region in the input image;
    and wherein extracting further comprises:
    extracting skin colors from the detected skin region.

3. The method of claim 1, wherein extracting further comprises:
   extracting skin colors from a skin training image.
4. The method of claim 2, wherein detecting a skin region further comprises:
   detecting a face region as a skin region in an input image.
5. The method of claim 1, wherein analyzing further comprises:
   analyzing the extracted skin colors to calculate axes of a different vector space, the axes being calculated using principal components analysis (PCA).
6. The method of claim 1, wherein projecting further comprises:
   projecting the transformed colors to fewer dimensions of the different vector space.
7. The method of claim 4, wherein skin color regions are extracted from the face region.
8. The method of claim 6, further comprising:
   generating a lookup table according to the result of projecting the skin colors to fewer dimensions of the different vector space; and
   wherein using the result further comprises: using the lookup table to identify a color from the input image as a skin color.
9. The method of claim 6, wherein projecting further comprises:
   projecting the extracted skin colors to fewer dimensions of the different vector space, the fewer dimensions excluding a principal axis, wherein the principal axis is the axis having the largest eigenvalue of the axes of the different space.
10. The method of claim 1, wherein extracting further comprises:
    extracting 3-dimensional skin colors; and
    wherein analyzing further comprises:
    analyzing the extracted skin colors to calculate axes of a 3-dimensional PCA vector space; and
    projecting the extracted skin colors to 2-dimensions of the 3-dimensional PCA vector space.
11. The method of claim 8, wherein the lookup table comprises skin colors projected to 2-dimensions of the different vector space.
12. The method of claim 1, wherein correcting the color identified as a skin color further comprises:
    extracting the color from the input image;
    transforming the color to the new vector space; and
    identifying the color as a skin color based on a closeness of the transformed color to the transformed skin colors in the new vector space,
    wherein identifying the color as a skin color further comprises:
    identifying the color as a skin color further based on identifying skin regions in the input image and identifying the color as a skin color based on the geographic closeness of the color to an identified skin region in the input image.
13. The method of claim 1, wherein colors are represented using one of the following color models: red, green, and blue (RGB); hue-intensity-saturation (HIS); luminance and hue (YIQ); and, luminance and chrominance (YCC).
14. An apparatus for skin color correction, the apparatus comprising:
    a face region detecting unit configured to detect a face region in an input image;
    a skin color extracting unit configured to extract skin colors from the detected face region;
    a principal component analyzing unit configured to perform a principal components analysis using skin colors extracted by the skin color extracting unit to calculate axes for a principal component analysis (PCA) vector space and transform the extracted skin colors to the PCA space; and
    a skin color correcting unit configured to identify a color of the input image as a skin color using the result of the transformed skin colors to the PCA space and configured to correct a color identified as a skin color.
15. The apparatus of claim 14, wherein the principal component analyzing unit is further configured to project the transformed extracted skin colors to 2-dimensions of the PCA space.
16. The apparatus of claim 15, wherein the principal component analyzing unit is further configured to project the transformed extracted skin colors to 2-dimensions of the PCA space, the 2-dimensions not including a principal axis, wherein the principal axis is an axis having the largest eigenvalue from among the axes of the PCA space.
17. The apparatus of claim 14, further comprising a lookup table generating unit for generating a lookup table according to the result of the transformed skin colors to the PCA space,
    wherein the skin color correcting unit identifies a color as a skin color using the lookup table.
18. The apparatus of claim 14, wherein the skin color correcting unit comprises:
    a skin region separating unit for separating skin regions from the input image according to skin color;
    a skin correction region designating unit for designating regions to perform skin color correction from among the separated skin regions; and
    a skin color correction processing unit for performing a skin color correction on the designated regions.
19. A non-transitory computer readable recording medium encoded with a computer executable program to perform the method according to claim 1.

* * * * *